United States Patent Office 2,861,821
Patented Nov. 25, 1958

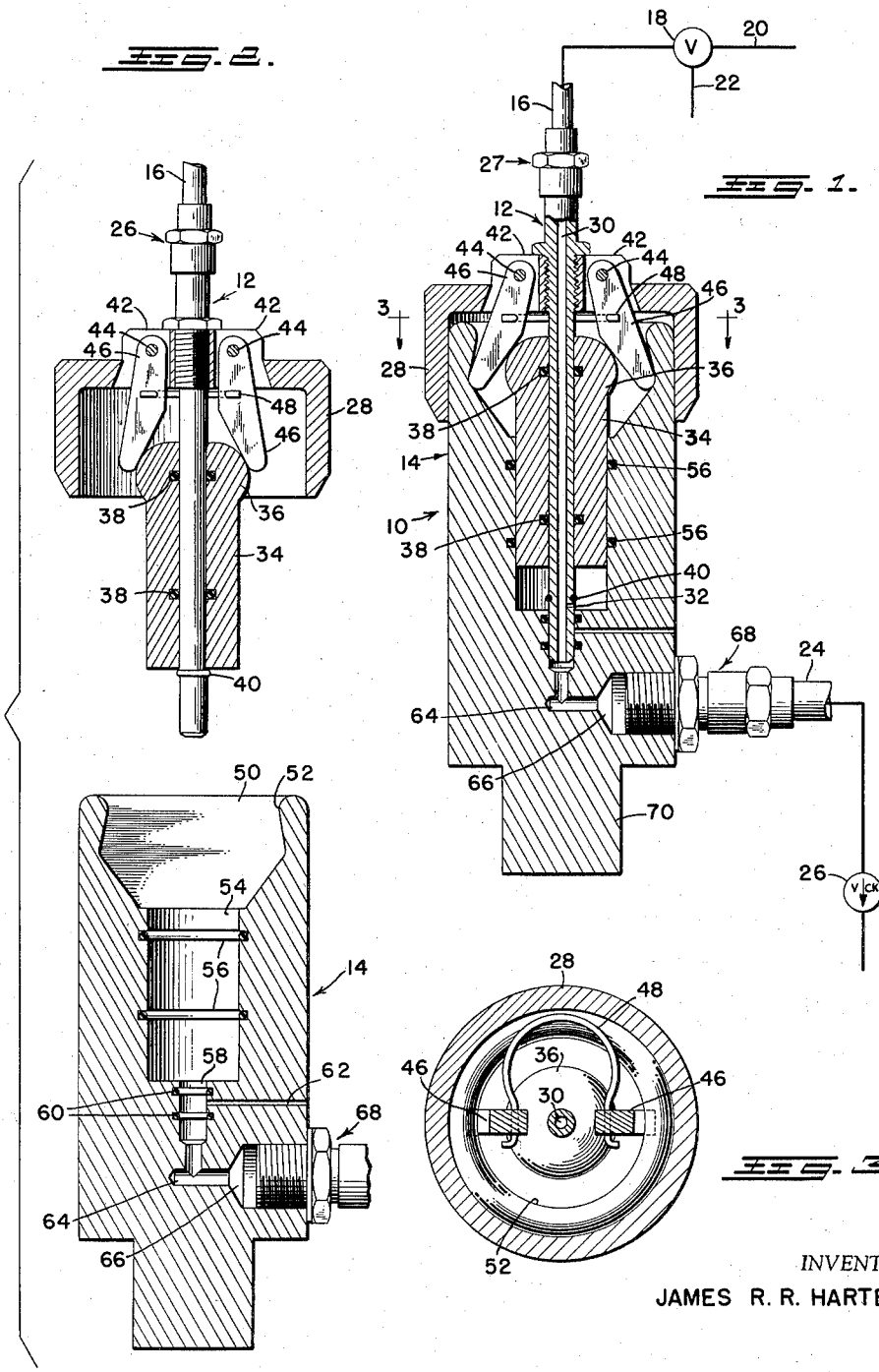

2,861,821

FLUID PRESSURE ACTUATED COUPLING

James R. R. Harter, Washington, D. C.

Application May 29, 1956, Serial No. 588,197

3 Claims. (Cl. 285—306)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in detachable coupling devices for connecting fluid conduits.

More particularly, this invention relates to remote controlled release, couplings for high pressure air lines or the like.

While not limited to such use, this invention has particular application to high pressure air lines used in underwater work.

In underwater photography or television transmission, for example, the operator works in a negatively buoyant chamber to which compressed air must be supplied. In the past this compressed air has been supplied in one of two ways. That is; either a hose is permanently connected between the submerged chamber and a source of compressed air on the standby ship; or a flask of compressed air under relatively high pressure, say 3000 p. s. i., is carried by the chamber. The hose method is not satisfactory for the reason that the necessarily long length of hose is bulky, awkward to handle and it interferes with the manipulation of the submerged chamber. The high pressure flask method is unsatisfactory in that much of the relatively expensive, high pressure compressed air is wasted in manipulating the chamber between the time it is lowered from the standby ship and until it is maneuvered into operating position at the desired depth of submersion, which waste of air limits the period of submersion.

It is, therefore, a broad object of this invention to provide means for overcoming the above difficulties of supplying compressed air to a submerged chamber or the like.

A further object of this invention is to provide a supplementary source of compressed air for use during the maneuvering of a negatively buoyant chamber into operating position.

A further object of this invention is to provide a readily detachable means for supplementing a flask supply of compressed air to a negatively buoyant chamber during the maneuvering of such chamber into submerged position.

Another broad object of this invention is to provide an improved detachable coupling for fluid conduits.

A more specific object of this invention is to provide a remote controlled, pressure operated, detachable coupling for fluid conduits.

Briefly, in accordance with this invention there is provided a detachable coupling for connecting an air hose to a flask supplied, negatively buoyant chamber in a manner that compressed air may be supplied to the chamber from a source on a standby ship during the time that the chamber is being maneuvered into and below the water to the desired operating depth of submersion, after which by merely discontinuing the supply of compressed air through the coupling, as by turning off a valve on the ship and bleeding the line, the hose is automatically detached from the chamber, leaving the chamber free for maneuvering and supplied with compressed air by a high pressure air flask carried thereby. In this manner the high pressure air is conserved in the flask and the chamber is free of any hose connection with the ship.

The invention together with the above and other objects and advantages thereof is set forth in more technical detail in the following description and accompanying drawing wherein like reference numerals designate like parts throughout the several views, in which:

Fig. 1 is a longitudinal section through an assembled, remotely controlled, detachable coupling in accordance with this invention;

Fig. 2 is an exploded view, showing the coupling of Fig. 1, disassembled; and

Fig. 3 is a tranverse section taken on line 3—3 of Fig. 1.

Referring now to the drawing, particularly to Fig. 1, wherein there is shown by way of illustration a detachable coupling 10 including a stem portion 12 and a socket portion 14. The stem is connected by a hose 16 and a three-way valve 18 to a conduit 20, which conduit is connected to a suitable source of compressed air, as a compressor located on a standby ship, not shown. As shown, the three-way valve 18 has a bleeder connection 22 leading therefrom. The socket 14 is connected by a conduit 24 to an air line forming, for example, a part of the compressed air system of a negatively buoyant chamber, not shown. For reasons pointed out hereinafter, the conduit 24 is provided with a check valve 26, opening in the direction of the arrow, Fig. 1.

The stem 12 of the coupling is provided with a conventional connector 27 at the upper end thereof for attachment to the hose 16. Also at the upper end the stem is formed with a threaded portion for the reception of a threaded cap 28. A longitudinal passageway 30 extends through the stem and has a transverse port 32 leading therefrom. A piston 34, having a generally spherical head 36, is slidably mounted on the stem 12 and is rendered fluid tight therewith by a pair of O-rings 38. A slip ring 40 mounted on the stem limits downward movement of the piston relative to the stem, retains the piston on the stem and prevents the piston from closing the port 32. The cap 28 is formed with a pair of bosses 42, from which are suspended, as by pivot pins 44, a pair of retaining arms 46. The retaining arms are biased toward collapsed position (Fig. 2) by a U-shaped spring 48.

The socket portion 14 of the coupling is formed with a large recess or cavity 50 surounded at the top by an annular flange 52 and opening into a cylindrical cavity 54, which cylindrical cavity is adapted to receive the piston 34 and is rendered fluid tight therewith by a pair of O-rings 56 that are mounted within a pair of annular grooves within the cylinder wall. At the bottom of the cylinder 54 there is provided a second and smaller cylindrical cavity 58 for the reception of the lower portion of the stem 12 and which portion of the stem is rendered fluid tight with the smaller cylinder by a pair of O-rings 60 mounted within the wall thereof, and which O-rings are vented to the ambient by a transverse passage 62.

As shown in Fig. 2, the bottom of the smaller cylinder 58 opens into an angular port 64, which port opens into a large port 66. The port 66 is threaded to receive a standard connector 68 by which the socket is connected to the discharge conduit 24. The socket portion of the coupling is formed with a mounting lug 70 by which it is attached to the compressed air system of the negatively buoyant chamber, or the like, not shown. In practice, the socket portion of the detachable coupling remains a part of the apparatus or system to which compressed air is to be supplied; whereas, the stem portion remains a part of the apparatus which supplies the compressed air.

In operation, assuming that the detachable coupling 10 is to be used for supplying compressed air to a negatively buoyant chamber when such chamber is being maneuvered from aboard ship into and beneath the surface of the water to a desired position, the stem portion 12 of the coupling is fitted into the socket portion 14 with the piston 34 in the lower portion of the cylinder 54 and with the cap 28 fitting loosely over the top of the socket and open to ambient pressures. With the parts manually and temporarily held in this position, the three-way valve 18 is slowly opened so that compressed air passes from the supply conduit 20 through the hose 16, longitudinal passage 30 and transverse passage 32 into the cylinder 54 beneath the piston 34. The one-way check valve 26 being closed and so loaded that at this point the pressure of the compressed air is not sufficient to open this valve, the air instead enters the cylinder with sufficient pressure to force the piston outward of the cylinder, whereupon the spherical head of the piston contacts and expands the arms 46 into engagement with the flanged portion 52 of the socket (Fig. 1) thereby locking and sealing the stem to the socket. The three-way valve 18 is then fully opened so that now compressed air passes through the coupling with sufficient pressure as to open the check valve 26 for passage of air therethrough and through the conduit 24 to the air system of the chamber, not shown.

The chamber is now ready to be lowered overboard the standby ship, into and beneath the surface of the water with the supply hose 16 fixedly coupled thereto. After the chamber is away from the ship and suitably submerged, an operator thereon signals an operator on the ship whereupon the three-way valve 18 is turned to the position that shuts off the supply of air from conduit 20 and opens a passage between the hose 16 and the bleeder conduit 22, whereupon the hose 16, passages 30 and 32 and cylinder 54 below the piston are vented of air. The check valve 26 now being closed against reverse flow of air therethrough, the pressure on the bottom of the piston is reduced to a point below ambient pressure which causes the piston to drop whereupon the arms 46, aided by the spring 48, are collapsed (Fig. 2) enabling the stem to be withdrawn from the socket by tension or pull on the hose 16. The hose with the stem connected thereto is then reeled in aboard ship and the submerged chamber is on its own, supplied with compressed air by its own high pressure flask and unencumbered by any hose connection with the standby ship.

In the above description, the invention is used in a specific environment, that of supplying compressed air to a negatively buoyant chamber during the maneuvering of such chamber into an operating or submerged position, and but one specific embodiment of the invention has been illustrated and described. The invention may, however, take other forms and be variously applied. It is therefore to be understood, that within the scope of the appended claims, the invention may be practiced otherwise than as specifically described.

What is claimed is:

1. A conduit coupler comprising a socket portion and a stem portion, a fluid discharge passage provided in one end of the socket, a fluid receiving passage formed in the stem and extending the length thereof and opening into the fluid discharge passage in the socket, means connecting the discharge passage of the socket to a discharge conduit, means connecting the stem passage to a supply conduit, said socket portion being provided with an axially extending bore open at one end thereof, an inwardly extending, annular flange provided on the socket at the open end of the bore, a piston slidably mounted on the stem for movement into and out of the bore of the socket, said piston having an outer end thereof positioned in the outer open end of the bore and subject to ambient pressures and an inner end thereof within the inner end of the bore and forming therewith a fluid chamber, cam faces formed on said outer end of said piston, means for admitting fluid under pressure from said stem to said chamber to thereby force the piston outwardly of the bore, a plurality of locking members pivotally mounted at one end thereof to said stem and having intermediate portions thereof positioned in the path of travel of the outer end of the piston and engageable by said cam faces thereon, said locking members having opposite end portions thereof adapted to engage the underside of the annular flange on the open end of the socket, the construction and arrangement being such that the locking members are held in locking engagement with the underside of the flange so long as fluid under pressure is supplied to the fluid chamber, whereas upon discontinuance of the supply of fluid under pressure to such chamber, the piston is free to move relative to the stem and bore to thereby disengage the locking members from the underside of the flange.

2. A coupling as set forth in claim 1 wherein the means for supplying fluid under pressure to the fluid chamber includes a port in a lower portion of the stem connecting the fluid passage of the stem with the fluid chamber.

3. A coupling as set forth in claim 1 wherein the supply conduit includes a multi-ported valve operable in one position thereto to supply fluid under pressure to the fluid passage of the stem and to the fluid chamber and operable in a second position to discontinue the supply of fluid to the passage of the stem and to the fluid chamber and to bleed fluid from such passage and chamber.

References Cited in the file of this patent

UNITED STATES PATENTS

| 945,517 | Goodwin | Jan. 4, 1910 |
| 1,360,588 | Sanderson | Nov. 30, 1920 |
| 2,025,225 | Creveling | Dec. 24, 1935 |
| 2,061,062 | Davis et al. | Nov. 17, 1936 |
| 2,396,499 | Fitch | Mar. 12, 1946 |
| 2,469,198 | La Pointe | May 3, 1949 |
| 2,516,758 | Davis | July 25, 1950 |
| 2,525,037 | Krapp | Oct. 10, 1950 |
| 2,568,092 | Sloan et al. | Sept. 18, 1951 |
| 2,724,441 | Rogers | Nov. 22, 1955 |
| 2,736,384 | Potts | Feb. 28, 1956 |

FOREIGN PATENTS

| 668,840 | Great Britain | Mar. 26, 1952 |